United States Patent [19]

Burklund

[11] 4,246,833
[45] Jan. 27, 1981

[54] HIGH PRESSURE SPHERICAL PISTON

[75] Inventor: Vernon D. Burklund, Ridgecrest, Calif.

[73] Assignee: The United States of America as represented by the Secretary of the Navy, Washington, D.C.

[21] Appl. No.: 974,394

[22] Filed: Dec. 29, 1978

[51] Int. Cl.³ .......................... F01B 31/10; F16J 9/00
[52] U.S. Cl. ........................................ 92/155; 92/172; 92/248
[58] Field of Search ............... 92/162 R, 162 P, 177, 92/172, 167, 155, 248, 249

[56] References Cited

U.S. PATENT DOCUMENTS

| 2,710,137 | 6/1955 | Arnouil | 92/78 |
| 2,792,790 | 5/1957 | Copps | 417/550 |
| 2,956,845 | 10/1960 | Wahlmark | 92/256 |
| 3,035,879 | 5/1962 | Hanny et al. | 92/162 R |
| 3,181,779 | 4/1965 | Rhodes | 92/172 |
| 3,320,902 | 5/1967 | Paschke | 417/510 |
| 3,695,150 | 10/1972 | Salzmann | 92/169 |
| 3,716,310 | 2/1973 | Guenther | 92/172 |

Primary Examiner—Paul E. Maslousky
Attorney, Agent, or Firm—R. S. Sciascia; W. Thom Skeer; Kenneth G. Pritchard

[57] ABSTRACT

A spherical piston for high-pressure applications. By shifting the o-ring groove to the pressure side of the major diameter of a spherical piston such that one edge of the groove is the major diameter, a very close fitting spherical piston that will not have metal to metal interference is created. Contrary to traditional spherical pistons, the spherical diameter of the present invention is less than the diameter of a cylinder wall. Elimination of metal to metal interference between the piston and the cylinder wall permits the piston to be made of harder metal than the cylinder wall without concern for damage if the piston cants on its axis within the cylinder.

14 Claims, 2 Drawing Figures

HIGH PRESSURE SPHERICAL PISTON

BACKGROUND OF THE INVENTION

1. Field of the Invention

This invention pertains to spherical pistons and particularly to high-pressure spherical pistons where the angular excursion of the piston as it rocks back and forth within the cylinder wall is a serious limitation in piston functioning Previously, excessive rocking of spherical pistons caused metal to metal interference between the piston and the cylinder walls. To avoid this problem, the spherical diameter of the spherical piston is reduced past that recommended by piston o-ring standards to avoid metal to metal contact. As a result the diametral clearance is exceeded based on current standards. Lower pressure is now required to prevent o-ring extrusion. High pressure spherical pistons traditionally have required a spherical diameter greater than the diameter of the cylinder walls which contain the piston. As a result, spherical pistons have not been practical for high-pressure applications unless the angular excursion of the piston was limited to a very narrow range.

2. Description of the Prior Art.

Example of a prior art spherical piston application is set forth in U.S. Pat. No. 2,710,137. U.S. Pat. No. 2,710,137 is a classic example of the use of a spherical piston in the prior art. A spherical piston is resorted to because of a high angular excursion or rocking of the piston within the cylinder wall. In this particular example of a spherical piston, no o-ring is used which forces the piston to rely on lubrication to avoid friction problems due to metal to metal contact between the piston and the cylinder wall and to maintain a seal.

A refinement or variation of this type of rocking problem is shown in U.S. Pat. No. 2,792,790 where a spherical piston is used with an o-ring to attempt to avoid physical contact between the metal of the piston and the metal of the cylinder walls. The piston arrangement shown in U.S. Pat. No. 2,792,790 has the o-ring centered on the major diameter of the spherical piston and thus permits maximum pressure in both the compression and downward strokes. In this particular patent, however, the inventor states that the piston is designed to be cocked more while it is being withdrawn than during the compression stroke. This off-sets the matching pressure advantage of a normal push-pull piston.

U.S. Pat. No. 3,695,150 shows the various methods of o-ring seals that have been used previously in spherical or rocking piston assemblies. To avoid loss of pressure in such a rocking assembly, U.S. Pat. No. 3,695,150 as shown in FIG. 18 resorts to changing the cylinder walls such that they are not in the form of a true cylinder any more to maintain a high pressure seal.

SUMMARY OF THE INVENTION

A high pressure spherical piston, which can also be thought of as a spherical piston with a very small diametrical clearance, is created by moving an o-ring to a nonsymetrical position. Shifting the o-ring to one side of the piston permits the spherical piston to have a diameter less than the diameter of the cylinder walls without the normal loss of pressure. Lubrication of the piston prevents o-ring extrusion. The placement of the o-ring limits the piston to a single acting mode.

DESCRIPTION OF THE PREFERRED EMBODIMENT

Figure 1:
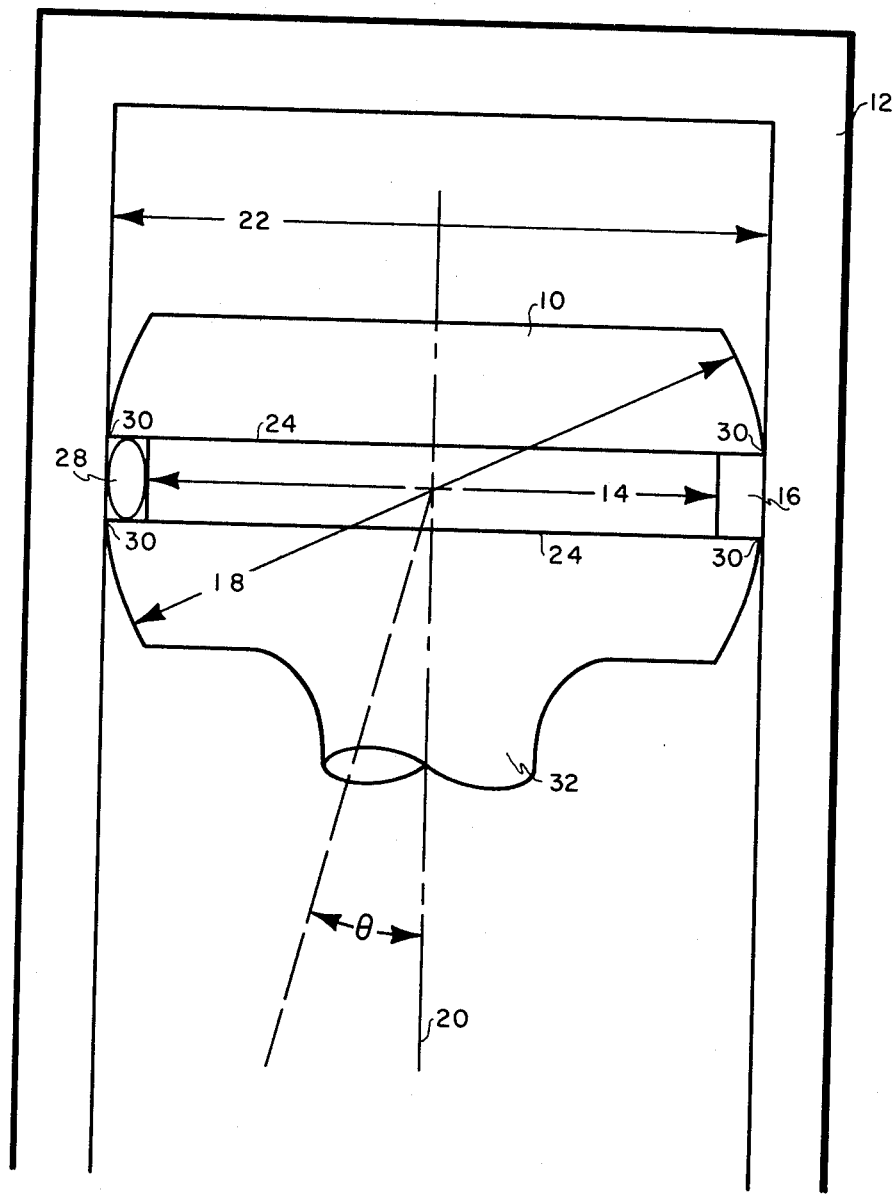
FIG. 1 is an example of a prior art spherical piston.

FIG. 1 shows the side view of a piston 10 confined within a block 12. Piston 10 is a conventional spherical piston with a major diameter 14. Major diameter 14 has a notch 16 centered on major diameter 14 which encircles piston 10. Arrow 18 shows an unnotched spherical diameter of spherical piston 10. Major diameter 14 is characterized as being centrally located within piston 10 and perpendicular to piston axis 20.

As shown in FIG. 1, major diameter 14 is not the greatest physical dimension shown. It is obvious that lines 24 represent wider distances than major diameter 14. Major diameter 14 would be the greatest physical dimension parallel to arrow 22 if notch 16 had not been removed. An unshortened major diameter is shown by arrow 18. The term "major diameter 14" is used to emphasize the location of where the only possible major diameter parallel to arrow 22 could be located.

Block 12 which is designed to contain pressure created by the movement of piston 10 has cylindrical inner walls of diameter 22. In the prior art, the spherical piston's diameter 18 is slightly greater than diameter 22. The effective width of piston 10 when it is not cocked within block 12 is along either of lines 24. This reduces the major diameter 14 along the piston axis to provide a margin of diametrical clearance for piston 10. The larger diameter of piston 10 is required by current theory if high pressures, such as 1000 psi are to be maintained. If the diameter of piston 10 is less that the diameter of block 12, tilting of piston 10 increases the gap between piston 10 and the walls of block 12 resulting in loss of pressure.

Within notch 16, an o-ring 28 is placed to ease passage of piston 10 within block 12. When piston 10 is operative with reciprocating movement parallel to axis 20, o-ring 28 provides a uniform pressure seal for both the upward and downward motion of piston 10. However, the basic reason for using spherical pistons is for applications where it is expected that the piston will be subject to angular excursion within the cylinder walls. Obviously, if the amount of angular excursion or rocking of piston 10 is great enough, there is a conflict between the spherical diameter shown by arrow 18 and diameter 22. Since the spherical diameter shown by arrow 18 is larger, excessive twisting or rocking of the piston within block 12 will cause points 30 to dig into the cylinder wall of block 12. This metal to metal interference will either cause the piston to bind or else so damage the walls that no effective pressure seal will be possible.

Piston 10 in FIG. 1 is shown attached to a connecting rod 32 which in turn is driven by some sort of reciprocating means, such as a drive shaft not shown, which provides a reciprocating motion on the piston. Throughout this discussion the phrase "reciprocating piston" will include a connecting rod and drive mechanism necessary to drive the piston in the well-known manner. Similarly, no inlet or outlet ports are shown in block 12. Use of the terms "block" or "cylinder walls" assumes their presence.

Figure 2:
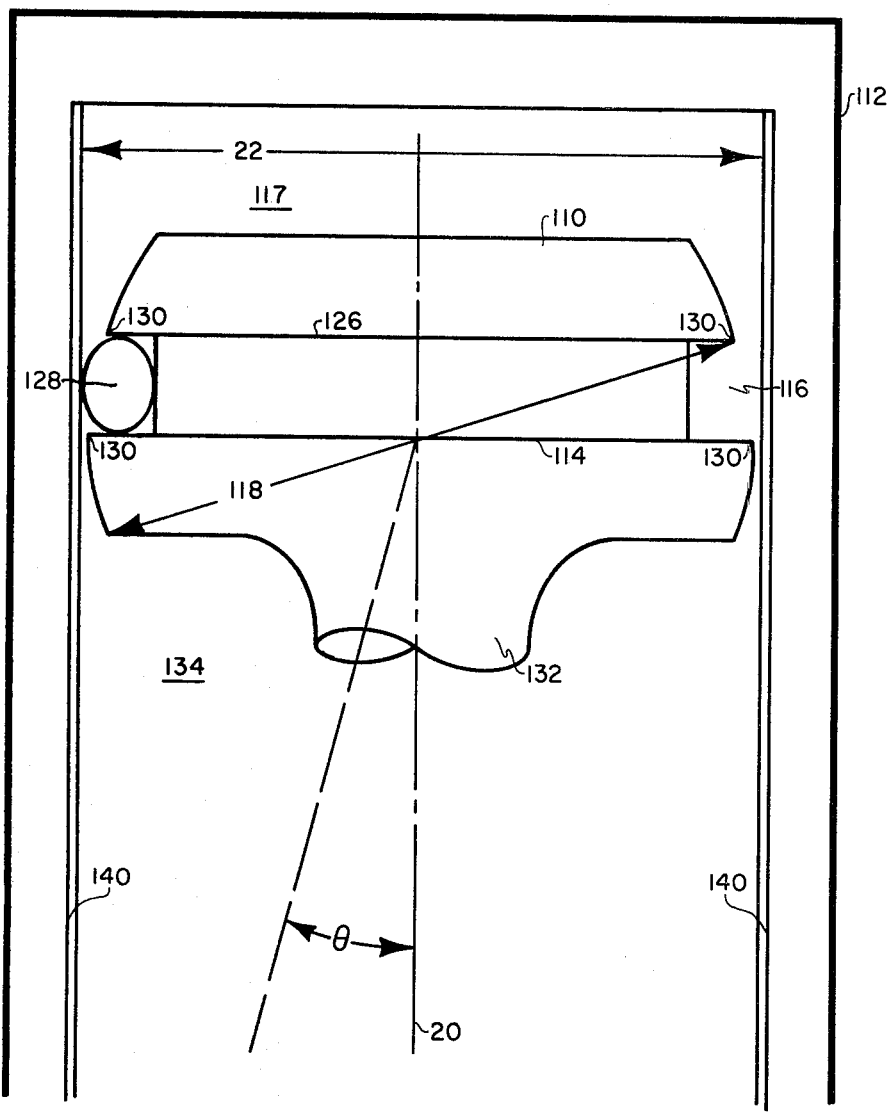
FIG. 2 is an example of the present invention.

FIG. 2 shows the preferred embodiment of the present invention. Spherical piston 110 is contained within a cylindrically walled opening of block 112. Block 112 has an inside diameter 22 which for purposes of example may be considered to be identical to diameter 22 of FIG. 1. Piston 110 is a reciprocating piston along axis 20 driven by connecting rod 132. Spherical piston 110 has a major diameter 114 which is now identical to any random cross-section spherical diameter 118. Once again, spherical piston 110 has a notched ring 116 around it. The notch 116 has been elevated so that it is on the pressure side of major diameter 114 and has major diameter 114 forming one edge of notch 116. The pressure side of piston 110 is that contained in the general cavity labeled 117. Placement of notch 116 above the major diameter rather than straddling it as is done previously in the prior art has several operationally significant effects which will be discussed further on. Within notch 116, an o-ring 128 is placed for facilitating smoothness of passage of the piston within the cylindrical walls of block 112.

As can be seen from comparing FIGS. 1 and 2, any rocking or angular excursion of piston 110 will not cause points 130 to be forced into metal to metal interference as is required in FIG. 1 of points 30. The cross diameter for any orientation of piston 110 is now the same. Thus, piston axis 20 can travel through an angle $\theta$ without causing interference.

Spherical diameter 118 is less than block diameter 22 by a very slight amount. The addition of o-ring 128 permits closure of the diametrical clearance. The diametrical clearance is equal to the difference in length of these two diameters. Thus, a tight fit without metal to metal contact of a spherical piston with the cylinder walls is achieved with this configuration. The removal of contact permits the piston and connecting rod to be made of harder metal than the cylinder block. As an example, block 112 can be made of aluminum while piston 110 and rod 132 are made of steel. Such a combination will provide a reduction in weight which is important for use in aircraft and other locations where weight is critical.

As can be seen from looking at FIG. 2, o-ring 128 has more support beneath it than above it. This is because line 126 is only a cord of the spherical piston rather than a diameter. Thus the diameter on the upper edge containing o-ring 128 is less than on the lower edge which is major diameter 114. O-ring 128 thus does not have as much support on the downward stroke of piston 110 as it does on the upward stroke. The effect of this is that if the lower side of piston 110 is pressurized, the area referred to by number 134, o-ring 128 will tend to extrude around the edges of line 126 and into the upper cavity 117. Extrusion of o-ring 128 around the upper edge 126 would result in either binding of the piston within the cylinder wall or the destruction of o-ring 128 which would cause sideslap of piston 110 within the wall. Thus, the present invention by its very nature is limited to a single-acting piston rather than a combined push-pull piston. Extrusion of o-ring 128 is less likely when a pressurized fluid is inserted into cavity 117 to do work on piston 110 than when piston 110 is required to do work by compressing fluid in cavity 117.

To reduce drag on o-ring 128 and to prevent its extrusion, or rollup, it has been found preferable to have o-ring 128 made of a silicon-rubber compound of shore hardness 90. Rollup refers to the folding of o-ring 128 over line 126 on the downward stroke of piston 110 due to the uneven support for o-ring 128 discussed. Specific pressure design configurations might permit more common levels of shore hardness to be used, but in general, it is expected that maximum stiffness of o-ring 128 will be preferred. Backup rings of nylon or teflon, not shown, are known devices that could also be used to prevent o-ring extrusion in the present invention.

Also, because of the unbalanced support for o-ring 128, it has been found that smoothness of operation is enhanced by providing a lubrication means 140 which permits smooth sliding of o-ring 128 against the interior walls of block 112. Lubrication means 140 can be any of the well known methods used to lubricate interior walls of piston devices. As an example, a solid film lubricant 140 on the cylinder wall is shown in FIG. 2. Any solid film lubricant, such as molybdenum disulphide, can be used. Any of the well known methods of lubricating pistons will work as well. For limited use operations, the piston and o-ring can be lubricated prior to assembly. Lubrication can also be performed automatically when the working fluid is oil.

What is claimed is:

1. A high pressure single-acting spherical piston assembly comprising:
    a block with a cylindrical opening of predetermined diameter for containing pressurized fluid;
    a reciprocating spherical piston with a major diameter and a single-acting side within said cylindrical opening for working with said fluid to perform a predetermined task with said contained pressurized fluid and where said spherical piston has a spherical diameter equal to said major diameter but less than the diameter of said cylindrical opening; and
    an o-ring placed in an o-ring groove on said spherical piston parallel to the major diameter of said spherical piston for closing a diametrical clearance equal to the difference between said cylinder diameter and said piston major diameter where said o-ring is on the single-acting side of said spherical piston such that one side of said o-ring groove forms a portion of the major diameter of said spherical piston such that said spherical piston can rock within said cylindrical opening without physical contact between said piston and said block.

2. A high pressure single-acting spherical piston as described in claim 1 further comprising a lubrication means within said block for preventing binding of said O-ring within said cylindrical opening.

3. A high pressure single-acting spherical piston assembly as described in claim 2 where said block is made of aluminum.

4. A high pressure single-acting spherical piston assembly as described in claim 2 where said reciprocating spherical piston is made of steel.

5. A high pressure single-acting spherical piston assembly as described in claim 2 where said O-ring is composed of silicon rubber of shore hardness 90 for preventing rollup or extrusion of said o-ring.

6. A high pressure single-acting piston assembly as described in claim 2 wherein said lubrication means comprises a solid film lubricant on the walls of said block.

7. A high pressure single-acting spherical piston assembly as described in claim 1 where said block is made of aluminum.

8. A high pressure single-acting spherical piston assembly as described in claim 1 where said reciprocating spherical piston is made of steel.

9. A high pressure single-acting spherical piston assembly as described in claim 1 where said o-ring is composed of silicon rubber of shore hardness 90 for preventing rollup or extrusion of said o-ring.

10. A high pressure single-acting spherical piston assembly comprising:
   an aluminum block with a cylindrical walled opening of predetermined diameter for containing pressurized fluid;
   a reciprocating steel spherical piston with a major diameter and a single-acting side within said cylindrical walled opening for working with said fluid to perform a predetermined task with said contained pressurized fluid and where said spherical piston has a spherical diameter equal to said major diameter but less than the diameter of said cylindrical walled opening; and
   an o-ring placed in an o-ring groove on said spherical piston parallel to the major diameter of said spherical piston for closing a diametrical clearance equal to the difference between said cylinder diameter and said piston major diameter where said o-ring is on the single-acting side of said spherical piston such that one side of said o-ring groove forms a portion of the major diameter of said spherical piston such that said spherical piston can rock within said cylindrical opening without physical contact between said piston and said block.

11. A high pressure single-acting spherical piston assembly as described in claim 10 further comprising a lubrication means within said block for preventing binding of said o-ring with said cylindrical walled opening in said block.

12. A high pressure single-acting spherical piston assembly as described in claim 10 where said o-ring is composed of silicon rubber of shore hardness 90 for preventing rollup or extrusion of said o-ring.

13. A high pressure single-acting spherical piston assembly as described in claim 11 where said o-ring is composed of silicon rubber of shore hardness 90 for preventing rollup or extrusion of said o-ring.

14. A high pressure single-acting piston assembly as described in claim 11 wherein said lubrication means comprises a solid film lubricant on the walls of said block.

* * * * *